United States Patent
Spilo et al.

(10) Patent No.: US 6,240,531 B1
(45) Date of Patent: May 29, 2001

(54) SYSTEM AND METHOD FOR COMPUTER OPERATING SYSTEM PROTECTION

(75) Inventors: Michael L. Spilo; Jonathan A. Daub, both of New York, NY (US)

(73) Assignee: Networks Associates Inc., Santa Clara, CA (US)

( * ) Notice: Subject to any disclaimer, the term of this patent is extended or adjusted under 35 U.S.C. 154(b) by 0 days.

(21) Appl. No.: 09/447,397

(22) Filed: Nov. 22, 1999

Related U.S. Application Data

(63) Continuation of application No. 08/941,513, filed on Sep. 30, 1997, now Pat. No. 5,991,856.

(51) Int. Cl.[7] ............................ G06F 11/25; G06F 9/44
(52) U.S. Cl. ............................ 714/38; 714/39; 714/42; 712/244; 711/163; 711/147
(58) Field of Search .................. 712/244; 370/458, 370/433, 465; 710/260; 709/215, 228, 230; 714/15, 30, 73, 38, 39, 42, 45, 51; 711/141, 167, 139, 147, 142, 163, 143; 785/135, 136; 380/25

(56) References Cited

U.S. PATENT DOCUMENTS

| | | | |
|---|---|---|---|
| 5,218,680 | * | 6/1993 | Farnell et al. ........................ 709/215 |
| 5,325,499 | * | 6/1994 | Kummer et al. ..................... 711/143 |
| 5,327,497 | | 7/1994 | Mooney et al. ........................ 380/25 |
| 5,559,992 | * | 9/1996 | Stutz et al. .......................... 385/135 |
| 5,651,137 | * | 7/1997 | MacWilliams et al. ............. 711/141 |
| 5,815,702 | * | 9/1998 | Kannan et al. ....................... 712/244 |

\* cited by examiner

Primary Examiner—Daniel H. Pan
(74) Attorney, Agent, or Firm—Darby & Darby

(57) ABSTRACT

A method for protecting a computer operating system from unexpected errors write-protects certain critical system components, thereby preventing corruption by application programs, and handles otherwise fatal program errors and infinite loops outside of the context of a malfunctioning program, permitting the program to be reactivated.

42 Claims, 5 Drawing Sheets

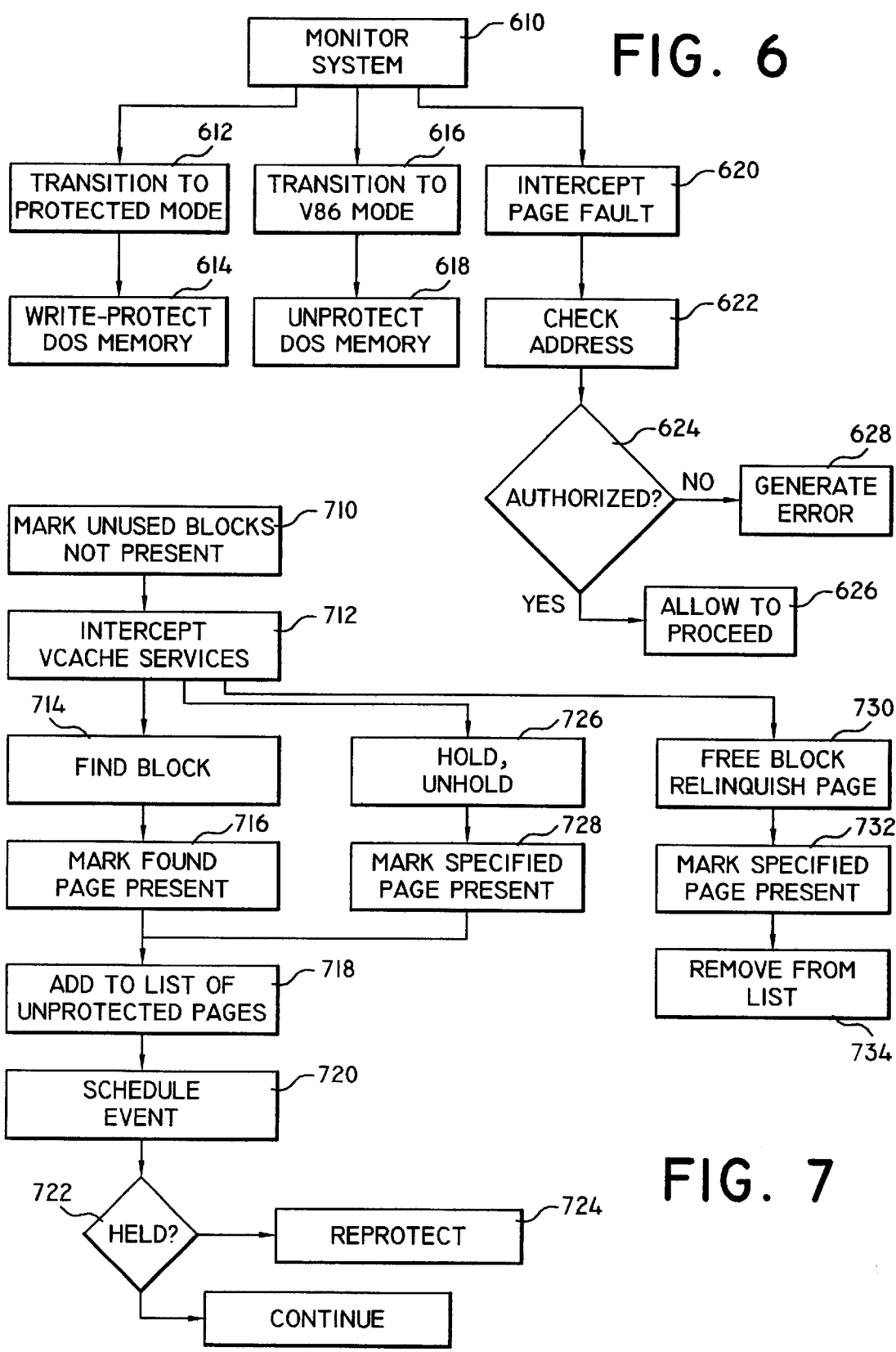

SYSTEM AND METHOD FOR COMPUTER OPERATING SYSTEM PROTECTION

This is a continuation of application Ser. No. 08/941,513, filed Sep. 30, 1997, now U.S. Pat. No. 5,991,856.

BACKGROUND OF THE INVENTION

The invention relates to a system and method for protecting a computer operating system from unexpected errors, and more particularly to a system and method for improving application stability under the Microsoft WINDOWS operating system.

Multitasking, graphics-based operating systems such as Microsoft WINDOWS 95 demand a high degree of expertise from an application programmer. The difficulties inherent in writing synchronized program code in an event-driven, multitasking environment, coupled with a vast and changing system application program interface ("API") consisting of thousands of functions, inevitably results in the production of software programs that contain errors, or "bugs," at several points. Even if an application program is tested relatively thoroughly, some portions of the program code may not be sufficiently exercised to locate the errors. And even if the erroneous portion is executed during testing, it may cause seemingly benign errors that pass undetected.

User input to software, through the keyboard, mouse, etc., is frequently unpredictable. Because of this, an application may attempt to process a combination of parameters that was not anticipated by the programmer. In this case, too, the program may respond in a benign manner, or in some circumstances may cause certain regions of memory to be inadvertently altered, or "corrupted." Those memory regions might "belong" to the program being executed, or might belong to the operating system or another loaded program. Similarly, the corrupted regions might include important data, or they might be unallocated storage. It generally is not possible to be able to determine, in advance, what regions of memory a defective program might attempt to access.

In some circumstances, a programming error may trigger a CPU exception if the program attempts to perform an illegal operation. A CPU exception is the central processing unit's response to an error condition, whether expected or unexpected. For example, an attempt to perform an undefined mathematical operation (such as dividing by zero), an attempt to access a memory location that does not exist, or an attempt to execute code that does not satisfy the CPU's syntax requirements, will typically result in a CPU exception. However, not all CPU exceptions result in a "crash" of the system. A CPU exception will cause a software interrupt. That is, when a CPU exception is encountered, processing immediately stops and is transferred to another program location.

That other program location can contain a segment of program code designed to take whatever action is intended by an operating system programmer. For example, an error message can be presented to the operator. Alternatively, if the CPU exception was expected, then other processing can be performed. Such an exception-handling scheme is used in Microsoft WINDOWS and other operating systems to handle "virtual memory," in which disk storage is used to virtually increase the amount of system memory. Some of the contents of system memory are "swapped out" to disk and removed from memory. Upon a later attempt to access those contents, a CPU exception will occur because the contents sought do not exist within system memory. The operating system will then handle that expected CPU exception condition, bring the contents back into system memory, and allow the operation to proceed.

Most complex operating systems, including Microsoft WINDOWS 95, use CPU exception handling techniques in performing a wide variety of operations. Even so, in many cases, a CPU exception will reflect an error or malfunction. In such cases, the operating system will typically not be able to correct the malfunction, and can only present an error message (typically a cryptic one, useless to all but the most experienced and knowledgeable programmers) to the computer operator.

Depending on the nature of the malfunction, and the action, if any, that the operating system takes in an attempt to block or remedy the malfunction, the offending program can perform in one of numerous ways. The system may stop executing and appear to be deadlocked. The application may continue executing despite the possibility that important data has been corrupted. The application may be shut down by the operating system, or may so adversely affect the operating system itself that the computer must be restarted with an accompanying loss of data.

One goal of operating system design is to minimize the possibility of data loss, and the general trend for the most advanced operating systems, such as Microsoft WINDOWS NT, has been to shield (as far as possible) the memory regions containing the operating system's code and data from the reach of an application program. In other words, an application program can alter itself and its own data, but would be entirely unable to affect any other portion of the system, including other application programs and the operating system itself.

However, a rigorous implementation of this architecture may not be feasible in a mass-market operating system which is designed to operate on lower-cost systems, which typically have slower CPUs and tighter system memory constraints. Therefore, the Microsoft WINDOWS 95 operating system, which substantially retains the memory architecture of earlier versions of WINDOWS, remains highly susceptible to many types of program errors. In fact, it is relatively easy to write code that will crash the operating system.

One program of this kind is discussed in Schulman, Unauthorized Windows 95 (IDG Books 1994), and is available from //ftp.ora.com/pub/examples/windows/win95.update/unauthw.html. This program, RANDRW, purports to measure the susceptibility of various operating systems to serious program errors. According to its author, RANDRW makes random memory accesses across the memory range of the system. An access is deemed a "hit" if it is allowed to proceed without being blocked by the operating system. In the WINDOWS 95 environment, Schulman reported a hit rate of approximately 1.5%, indicating that improper accesses were being allowed to occur. It should be noted that the 4 gigabyte address space in which WINDOWS 95 runs is generally about 90% unused and uncommitted, so that the 1.5% hit rate within the 4 gigabyte range translates into a much larger percentage of wrongful memory access and data corruption.

A breakdown of RANDRW memory accesses by address has shown that almost all of the core WINDOWS system components are susceptible to being corrupted in this way. The ease with which a 32-bit application program can affect critical system memory is especially alarming because the entire address range of the processor, including the address ranges occupied by critical system components, is within the accidental reach of the program. Older 16-bit programs are able to reach a narrower extent of system resources, but are still able to cause serious damage.

Unfortunately, it is practically impossible to predict the manner of a malfunction. When one occurs, it is correspondingly difficult to remedy the malfunction so that the program that caused it is able to proceed. If there is an isolated stray access, it may be possible to block the access with no appreciable affect on the program. More likely, an application program was attempting to perform a certain operation when it went awry, and its failure to accomplish the operation will affect further operations. Hence, one fault results in another, and the entire course of the program is altered. In certain circumstances, the CPU context of the program may become damaged. For example, an unbalanced stack may cause the stack pointer to be reset, thereby making continued execution of the program impossible and a haphazard restoration of the CPU context unavailing. A side effect of this latter kind of error is that fault handlers built into the program (even those outside of the application program but executing at the same CPU privilege level as the program) will probably also be unable to execute or will themselves malfunction in the attempt.

In addition, one further type of application failure can be identified, in which the application appears to be deadlocked because it is improperly executing an infinite loop. A failure of this kind will not result in a CPU fault and may not cause any data to be corrupted. However, because the program is essentially deadlocked, it might not accept any further input, necessitating a forced shutdown with data being lost.

One prior attempt to address these issues is embodied in the software utility called FIRST AID, various versions of which have been available from Cybermedia, and similarly in subsequent products such as NORTON CRASH GUARD from Symantec and PC MEDIC from McAfee Associates. In FIRST AID, an assumption is made that the architecture of almost all WINDOWS programs is founded on a core piece of program code called the "message loop." In general, after an application program is initialized by creating one or more windows to be displayed on the desktop, it enters the message loop, from which it exits only when the program is terminated. The message loop itself consists of a series of prescribed WINDOWS API function calls that pick up user input and other messages from a system-managed queue, associate them with one of the application's windows, and dispatch them to the message handling procedure of the appropriate window for processing.

The majority of an application's program code is contained in its window procedures, and is caused to be executed either, in the first case, indirectly when a message is dispatched from the message loop, or in other cases, by the WINDOWS operating system bypassing the message loop and calling the window procedure directly. Although there are certain other means by which an application's program code can be executed, these are in a minority. Therefore, when a program malfunctions, it is likely to be executing code contained in its window procedures in response to some message.

FIRST AID makes the assumption that the specific message input that caused the error may not be repeatable, and that it may not be necessary to complete processing of the specific message input. Instead, FIRST AID attempts to enter a new message loop at the point that otherwise the program would have been terminated. For this purpose it installs a driver that gains control whenever a CPU fault occurs. Executing within the context of the faulting application, the driver alerts the user to the error condition, and allows him to decide to terminate the application, as would happen normally, or to reactivate it. Reactivating the application consists of a series of steps intended to ensure that certain abnormal conditions are reset, such as enabling input to the application's visible windows. The driver then enters its own message loop, which is probably fundamentally similar to that contained in the faulting program. Ideally, this will restore the appearance of activity to the application, and the user will be able to access the application's menus and controls at least long enough and well enough to save the application's data to disk.

In less than ideal conditions, however, the method of FIRST AID and subsequent products may be limited to a certain class of application errors, may crash the program by offering to recover it from an error that would not have turned out to be fatal, or may cause the operating system itself to become deadlocked, requiring a system restart. Furthermore, by assuming that the error occurred while the program was executing its own code, FIRST AID ignores the possibility that the error may have occurred within the WINDOWS graphical user interface ("GUI") subsystem. Consequently, by creating a GUI interface (such as a "dialog box") by which the user can choose to recover from the error, and by issuing WINDOWS API calls from within the new message loop, the WINDOWS subsystem may be reentered and further corrupted. The Microsoft documentation for the WINDOWS API function "InterruptRegister" notes in this regard that a fault callback procedure may "execute a nonlocal goto to a known position in the application .... This type of interrupt handling can be hazardous; the system may be in an unstable state and another fault may occur. Applications that handle interrupts in this way must verify that the fault was a result of the application's code." However, such verification is not made.

In addition, FIRST AID and the other known products utilize WINDOWS Kernel services, such as those contained in the "ToolHelp" library, in order to trap the error conditions, and therefore the error handling and recovery code in these products executes at the same CPU privilege level and in the same CPU context as the faulting program. However, as discussed above, depending on the nature of the error (e.g. if the program's stack pointer has been corrupted), it may be impossible or inadvisable to perform any significant operation from within the fault handling procedure, including attempting to reactivate the program by reentering its message loop. Alternatively, stack fault errors may cause the fault handling code to be entered using a separate stack from the one used by the faulting program, in which case FIRST AID will not attempt to return to the original stack prior to resuming the program.

Moreover, certain faults do not cause the fault handling procedure to be executed at all, for example if the original fault ultimately results in another fault occurring within the WINDOWS Kernel as it is attempting to call the fault handling procedure. Finally, neither FIRST AID nor other crash protection implementations provide any safeguards that prevent a malfunctioning program from corrupting the WINDOWS Kernel or other system components.

Another known protection method, embodied in Symantec's NORTON CRASH GUARD product for WINDOWS 95, provides crash recovery as generally described above, and also allows deadlocked applications executing in infinite loops to be reactivated. NORTON CRASH GUARD accomplishes this by providing in its interface an option to reactivate a program that NORTON CRASH GUARD has adjudged to be deadlocked. However, in order to activate the NORTON CRASH GUARD interface and hence reactivate the deadlocked program, the WINDOWS GUI subsystem must be able to perform a focus switch away from the deadlocked program to the NORTON CRASH GUARD interface. Depending on the nature of the deadlock, this may not be possible. For example, it may not be possible to invoke the NORTON CRASH GUARD interface when the deadlocked program causes the system itself to appear deadlocked because of holding certain resources that the system must acquire in order to activate another program.

Consequently, in view of the known limitations of prior crash protection utilities used in the MICROSOFT WINDOWS environment, it would be desirable to have a utility that is not so limited. Specifically, such a protection utility would allow applications to safely recover from most unanticipated CPU exceptions, at least long enough to save any data. Such a protection utility would also safeguard the operating system from being corrupted by an errant application program, thereby enhancing overall system stability.

SUMMARY OF THE INVENTION

The CPU exception handling system and method employed by the invention handles many different types of application-level faults. The invention allows the CPU context of a malfunctioning program to be recovered and repaired outside of the context of the program, thereby permitting recovery from relatively serious errors. Moreover, deadlocked applications can be recovered, even if they cause the system itself to appear deadlocked.

The invention includes a scheme for protecting the operating system and other running software from corruption by a malfunctioning program, thereby substantially confining the effects of an error to the context of the program that caused it.

To accomplish these purposes, the invention adapts the WINDOWS Kernel fault notification dialog to provide that fault notifications and recovery take place within a safe context outside the context of the malfunctioning program. The invention also adapts the WINDOWS Kernel process-termination dialog to provide that deadlocked applications may be recovered even when the system is otherwise deadlocked. Finally, CPU page-level protection is employed to write-protect major portions of the operating system and prevent them from being corrupted.

BRIEF DESCRIPTION OF THE DRAWINGS

FIG. 6. is a flowchart illustrating the process performed in the protection of DOS memory from inadvertent alteration by a WINDOWS program; and FIG. 7 is a flowchart illustrating the steps performed in protecting the disk cache from inadvertent alteration by an errant program.

DETAILED DESCRIPTION OF THE INVENTION

A comprehensive scheme of CPU exception handling and operating system protection implemented according to the invention includes two primary components: (1) trapping and recovering from unexpected CPU exceptions and infinite loops; and (2) protecting portions of the WINDOWS operating system from inadvertent and erroneous attempts to write data. These aspects and components of the invention will be discussed in detail below.

Figure 1:
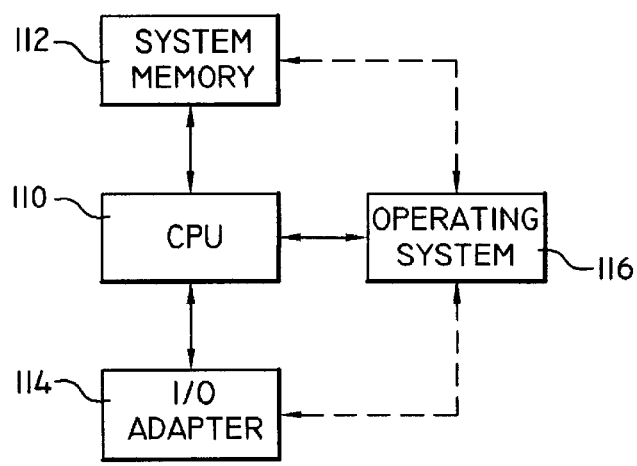
FIG. 1 is a diagram illustrating the relationship among functional hardware and software components in a typical computer system operating under WINDOWS 95.

The architecture of a typical computer system running Microsoft WINDOWS 95 is illustrated functionally in FIG. 1. A central processing unit ("CPU") 110 is coupled to system memory 112 and at least one I/O adapter 114. The I/O adapters present in a typically configured computer system can include interfaces to a keyboard, a pointing device such as a mouse, a video display, a printer, a modem, etc. The system is also furnished with operating system software 116, which oversees transactions between the CPU 110 and the system memory 112 or the I/O adapters 114.

Modern operating systems take advantage of this arrangement in numerous ways. For example, the capacity of system memory 112 can be effectively enlarged by a virtual memory method, in which disk storage (attached to the CPU by way of an I/O adapter 114) is used to supplement the system memory 112. When the CPU 110 attempts to access a portion of system memory 112 that is actually stored on disk, a CPU exception, or fault, will result. The operating system 116 anticipates this exception and acts accordingly to bring the requested contents into system memory 112 for access by the CPU 110.

Many CPU exceptions are anticipated and handled by modern operating systems in this manner. However, unanticipated CPU exceptions still occur, caused by careless programming, insufficient testing, or any number of other factors. As discussed above, these errors can cause an application program or the entire operating system 116 to become deadlocked.

Figure 2:
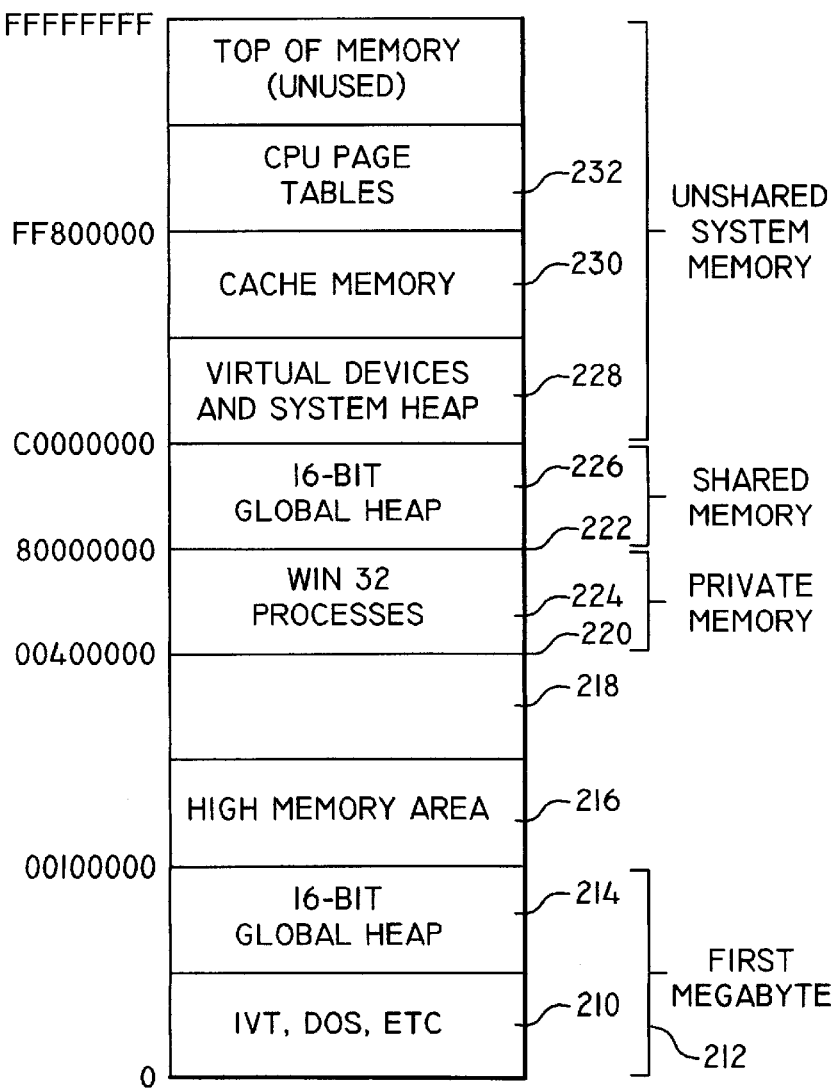
FIG. 2. is a diagram illustrating various portions of system memory as utilized under WINDOWS 95.

The system memory 112 is divided into a number of distinct regions, as shown in FIG. 2. A DOS region 210 occupies the portion of the system memory 112 between its lower end (given an address identifier of zero) and somewhere within a first megabyte 212. The remainder of the first megabyte 212 is devoted to a first portion 214 of the 16-bit Global Heap.

Immediately following the first megabyte is the high memory area ("HMA") 216. An empty region 218 following the HMA 216 up through the four-megabyte boundary 220 typically is not mapped to any system memory.

From the four-megabyte boundary 220 to a two-gigabyte boundary 222 is a private memory region 224. The private memory region 224 is occupied by 32-bit WINDOWS applications, as will be discussed in further detail below. The following, third, gigabyte is occupied by a second portion 226 of the 16-bit Global Heap, which is shared among the programs running on the system.

The remaining system memory, the fourth gigabyte of the four-gigabyte range, is unshared system memory. It includes a system region 228 for virtual device drivers and the system heap, followed by a cache region 230.

The final eight megabytes of addressable memory include the CPU page tables 232, which contain information (such as the write-protection information that will be discussed in further detail below) on the pages of physical memory mapped within the four-gigabyte range of FIG. 2.

It should be noted that while the diagram of FIG. 2 reflects a four-gigabyte range of memory, only a small portion of that range actually is usually occupied by physical system memory. However, pages of physical system memory can be mapped to nearly any portion of the range, and need not be contiguous.

Fault Trapping and Recovery

In order to allow a faulting application to be recovered, a CPU-exception-handling utility program should: (a) notify the user, in a safe manner, that the fault has occurred; and (b) allow the user to decide whether to attempt to recover the application using the method of the crash recovery program, or to proceed to close the application as would normally occur.

These operations can be accomplished by using a dialog that presents an informational message about the error condition, as well as buttons that the user can select to either close or recover the application. However, as discussed above, it is undesirable to create such a dialog or to attempt a recovery from within the task and CPU context of the program that caused the fault. The present invention provides that both activities occur in a safe, secondary context as more fully set forth below.

In WINDOWS 95, the sequence of events following a CPU fault occurring in an application is as follows. First, the fault causes an interrupt, which causes the CPU to transition from the application's privilege-level-three code, the least privileged, to the operating system's privilege-level-zero code, the most privileged. This causes a fault handling procedure within the WINDOWS Virtual Machine Manager (VMM) to be executed on the "ring 0" (privilege level zero) protected stack.

Second, the ring 0 fault procedure, after determining that the fault is an unexpected error condition (as opposed to a manageable fault, e.g. a page fault on a not present page or an input/output instruction to an emulated port), passes the fault to any device drivers that have installed fault hooks. These other device drivers, which may be ancillary portions of the operating system or components installed by other programs, might contain code to handle certain types of faults that they anticipate (but are unexpected by the ring 0 fault procedure of the operating system). As will be discussed in further detail below, the fault handling utility of the invention intercepts faults in a different way. If a device driver is able to handle the fault, then the rest of this procedure is not performed, and execution continues normally.

Third, by default, the fault is passed to handlers contained in the VWIN32 virtual device, a component of the WINDOWS 95 system Kernel. VWIN32 performs a nested call to a ring 3 (privilege level three) fault handler executing within the context of the faulting task. In some cases, the call is made on a protected stack so that the fault handler is able to execute.

Fourth, the ring 3 fault handler calls any fault hook procedures that have been installed, for example using the ToolHelp library or the Kernel debug notifications.

Fifth, the ring 3 fault handler, if it determines that the fault is uncorrectable, performs a transition back to VWIN32 in ring 0. Alternatively, if the ring 3 fault handler causes a second fault, the second fault is passed (according to the first and second steps above) to VWIN32, which recognizes the nested-fault situation and skips to the sixth step, discussed below.

Sixth, VWIN32 schedules an asynchronous procedure callback ("APC") to be executed at ring 3 from the context of a secondary service thread (separate from the faulting thread), reserved for processing events of this kind. The APC is a documented mechanism for ring 0 virtual device drivers to "call back" into an application program.

Seventh, the APC executing at ring 3 ensures that the GUI subsystem is in an unblocked state by releasing any resources, including mutexes (signals that prevent more than one process from executing a given code fragment at a time) and semaphores (signals used to synchronize two or more concurrently executing threads or processes) held by the faulting thread, which may be blocking the GUI from functioning normally.

Eighth, the APC creates a system modal dialog box that notifies the user of the nature of the error and allows him to close the application. As discussed above, this dialog box is created outside of the context of the faulting application.

Ninth, and finally, after the dialog box has been closed, the ring 3 APC returns to the ring 0 VWIN32, which causes the faulting application to be terminated.

By monitoring the dialog box created in the context of the secondary service thread (in the eighth step above), the invention obtains notification when a fault has occurred, including nested faults that do not get passed to application-level hook procedures (as discussed in the fifth step above). Moreover, the WINDOWS Kernel has ensured that it is safe to create the dialog box and otherwise call WINDOWS API functions by releasing resources held by the blocked thread.

By using a variation of the Kernel's own dialog, the CPU-exception-handling aspect of the invention ensures that its own activities do not undermine those of the operating system, and do not adversely affect the course of the faulting program should the error condition be correctable through other means. The invention provides that the user can recover the application by modifying the Kernel's dialog to include an extra button that the user can select if error recovery is desired.

Figure 3:
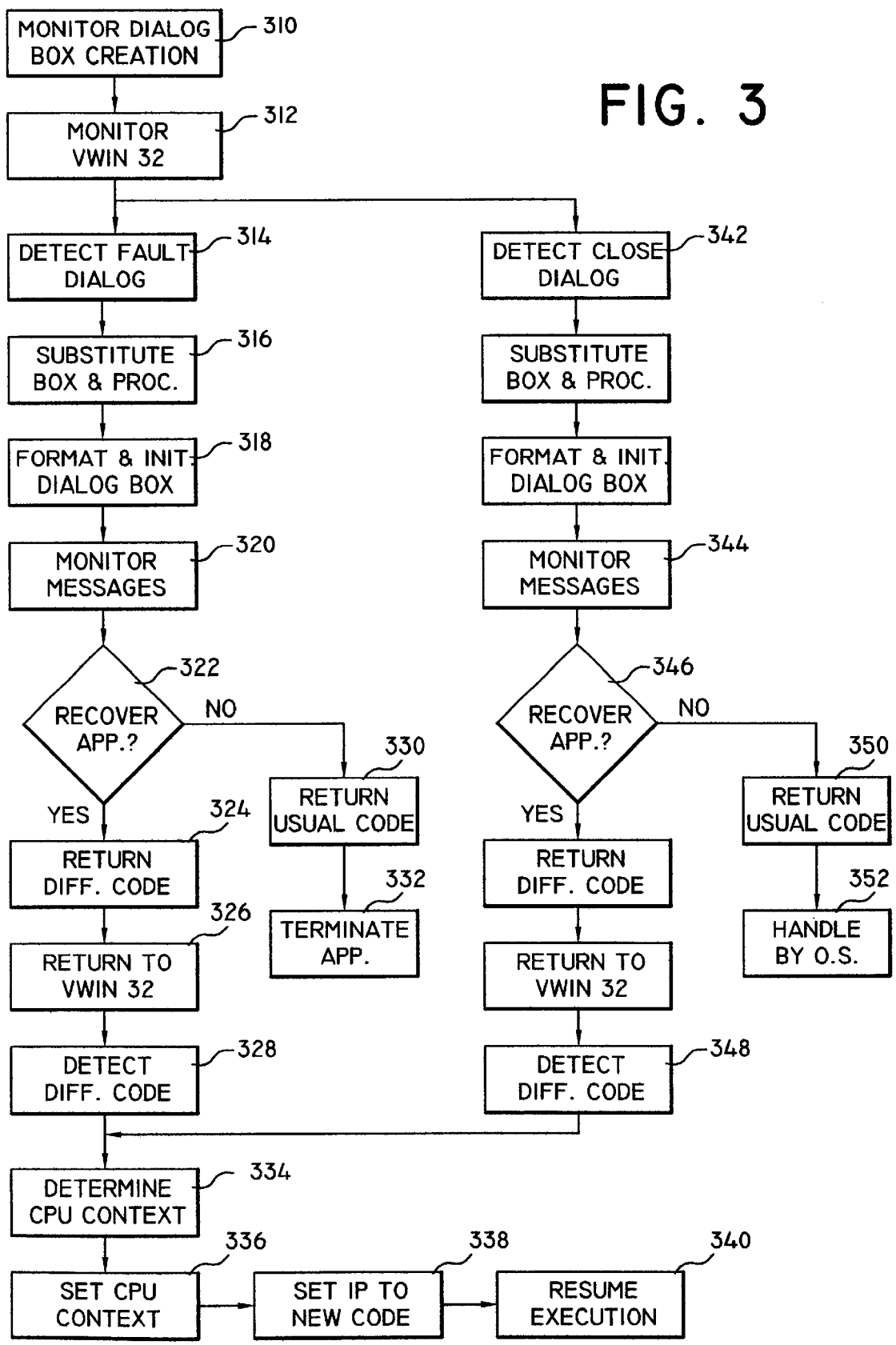
FIG. 3 is a flowchart illustrating the steps performed in a CPU exception or infinite loop recovery process performed according to the invention.

The steps performed in the CPU-exception-handling aspect are described in detail in conjunction with the flowchart of FIG. 3. In order to monitor the dialog box, the invention monitors the system at two levels. First, a ring 3 driver component of the invention monitors the "DialogBoxParam" function of the WINDOWS API (step 310), which is the function that the APC callback uses to create the dialog box notifying the user of the fault. Second, a ring 0 virtual device driver (also known as a "VxD") component of the invention monitors the VWIN32 device (step 312) at the third step of the sequence described above.

When the invention detects that the Kernel is creating its fault notification dialog (step 314), the invention substitutes its own dialog box and dialog procedure code for the Kernel's default dialog box and procedure (step 316). The invention's substituted dialog procedure calls the Kernel's procedure in order to format the notification message and otherwise initialize the dialog (step 318). Then, the invention's dialog procedure monitors messages to the dialog box (step 320) to detect whether the user has selected to recover the application (step 322), rather than terminate it. If so, the invention ends the dialog with a return code different from the return codes used by the Kernel to end the dialog (step 324). This return code is returned by the APC function to the VWIN32 procedure that invoked the APC (step 326). The ring 0 component of the invention, monitoring VWIN32 as described above, detects when the dialog has been ended with the invention's return code (step 328), and if so, recovers the application as described below. If the user chooses to terminate the application, the usual return code is sent to VWIN32 (step 330), and the operating system terminates the application as usual (step 332).

The invention's method of recovering an application first restores and repairs the application's CPU context from the protected context of the ring 0 VxD component of the invention, before execution of the application is resumed by entering a message loop. In doing so, the VxD component of the invention determines the correct values of the application's stack pointer, segment registers, and flags (step 334), and sets these values into the CPU context saved by the Kernel in its fault handling procedure (step 336). In addition, the application's instruction pointer is initialized to point to code within the ring 3 driver portion of the invention (step 338). The VxD component then returns from the fault via VWIN32 and the Kernel, which restores the corrected CPU context and resumes execution of the application at the invention's ring 3 driver code (step 340). The ring 3 driver code then performs any additional necessary reactivation steps; it also contains the message loop that will execute in place of the application's original message loop code.

As noted above, deadlocked applications executing in infinite loops represent a special kind of error condition, in that they may not signal any faults that would cause the Kernel's fault notification dialog box to be displayed. Moreover, such a deadlocked application may cause the GUI subsystem, and thus the system itself, to appear deadlocked. The method of the invention for allowing deadlocked applications to be recovered is similar to the general method described above for faulting-but-not-deadlocked applications. The WINDOWS 95 Kernel implements a second dialog termed the "Close Program" dialog, which is caused to appear when the user presses the "Ctrl-Alt-Del" key combination. When the system detects this combination, it schedules an APC callback to be executed in the context of the Kernel's secondary service thread. The APC callback attempts to release resources, as discussed above with respect to fault handling, so as to temporarily unblock the GUI subsystem and allow the "Close Program" dialog box to be displayed. Therefore, even when the system appears entirely deadlocked, it will often respond to the Ctrl-Alt-Del key combination and display the Close Program dialog box, allowing the offending application to be terminated.

The present invention additionally monitors the DialogBoxParam function to detect when the Close Program dialog is being created (step 342). If so, the invention substitutes its own dialog box and dialog procedure for the Kernel's (step 344). The invention's dialog box may otherwise resemble the Kernel's, but it contains an additional button which the user can select to attempt to recover an application that has become deadlocked. If the replacement dialog procedure detects (step 344) that this button has been selected (step 346), it notifies the ring 0 VxD component of the invention via a different return code (step 348), which obtains (step 334) and restores (step 336) the CPU context of the deadlocked application, using the method described above, and causes the application to begin executing at the replacement message loop of the ring 3 driver code of the invention (steps 338–340). Otherwise, if the user chooses not to attempt to recover the deadlocked application (step 346), the usual code is returned (step 350) and the operating system handles the situation in its usual way (step 352).

Once the application has begun executing again (by way of the alternate message loop operating in a different context), the user is typically able to operate the application well enough to save any data and shut down the application gracefully.

Operating System Protection

As demonstrated by the RANDRW program, even modern operating systems, such as WINDOWS 95, designed around microprocessors that implement a high degree of protection through privilege levels, remain susceptible to stray memory references. This can be seen from the WINDOWS 95 memory architecture, diagrammed as shown in FIG. 2.

Programs written specifically for 32-bit versions of WINDOWS (such as WINDOWS 95 and WINDOWS NT) are known as Win32 programs, or 32-bit programs, since they are able to directly manipulate 32-bit data by way of features available on Intel 80386 (and later) microprocessors. In contrast, 16-bit programs, such as those written for WINDOWS 3.11 and earlier, can only directly manipulate 16 bits of data at a time (the limit of Intel 80286 and earlier processors).

32-bit WINDOWS programs, which execute within the region 00400000 to 80000000 (see FIG. 2), own nearly half of the 4 Gb linear address space available on an Intel 80386 processor. The effects of corrupting any memory location within a program's own address space are confined to the program. However, every 32-bit program has direct access to the entire 4 Gb address range, with the exception of about 64 Kb (containing the interrupt vector table, DOS and its device drivers) to which Win32 data selectors do not map. It should also be noted that the cache memory which is managed by the VCACHE virtual device is typically protected from read or write access by user-mode (ring 3) programs, such as most applications. The remainder of the address space, including the VMM and all other virtual devices, the system heap, the GUI Kernel, and the memory of any 16-bit software that is executing, is unprotected and directly accessible by a 32-bit program. While 16-bit programs possess the same access rights to system memory, it is more difficult for a 16-bit program to make a stray access outside of the 16-bit Global Heap. In order to make such a stray access, the program must explicitly initialize or accidentally get hold of a selector that maps to system memory. Selectors that map to system memory are typically rare because the majority of selectors are managed by the WINDOWS Kernel and are confined to the Global Heap, or they are privilege-level-zero selectors that will generate a fault if used by a privilege-level-three program. In addition, 16-bit code contained in the Global Heap is protected because it is mapped by read-only code selectors (as opposed to read/write data selectors, which map to data portions of the Global Heap). Nonetheless, services exist in the WINDOWS API to allocate and initialize selectors to map memory anywhere in the system and there is the possibility that an improperly initialized or erroneously acquired selector may cause corruption of non-application memory.

As discussed in further detail below, the invention sets forth a method of protecting certain portions of memory deemed critical to the stability of the system from corruption by application programs. This aspect of the invention includes the following parts: (a) protection of 16-bit system components, such as the 16-bit Kernel; (b) protection of 32-bit system components; (c) protection of portions of the "first megabyte" of system memory (plus the high memory area, or "IHMA," immediately beyond the first megabyte), which typically includes DOS components, a portion of the Global Heap, and the interrupt vector table ("IVT"); and (d) further protection of memory regions used by the disk cache.

WINDOWS 16-Bit Kernel Protection

The WINDOWS 16-bit GUI Kernel consists of several separate components including KRNL386.EXE, GDI.EXE and USER.EXE. These modules reside in memory allocated from the WINDOWS Global Heap which, as discussed above, is visible to 16-bit and 32-bit applications alike. The portions of each of these modules containing program code, which represent a majority of each module, are loaded by the Kernel with a 16-bit code selector being allocated and initialized for each code segment in the module. Although the processor will block attempts to write to a segment through its code selector, it is possible to affect the segment using a data selector that has been improperly initialized. Moreover, 32-bit applications can use their 32-bit flat data selectors or stack selectors to write to any location in the Global Heap, including memory occupied by the Kernel's code segments.

The invention uses the CPU's page-level write-protection capabilities to prevent code segments from being modified by applications. In general terms, this is accomplished by identifying code segments to be protected, relocating the code segments to page-aligned regions of memory, and write-protecting the pages containing the relocated code segments.

Although the method of the present invention is capable of protecting all 16-bit code segments in the Global Heap, those segments belonging to the WINDOWS GUI Kernel are singled out as being particular critical to the stability of the system. Because memory in the Global Heap is allocated on a 32-byte granular basis, and because write protection is enabled on a page-by-page basis, 4096 bytes at a time, the invention first locates all such segments to be protected, and then relocates them to a range of page-aligned memory in which the code segments are laid end-to-end. The entire page-aligned memory range can then be write-protected in the page tables.

Figure 4:
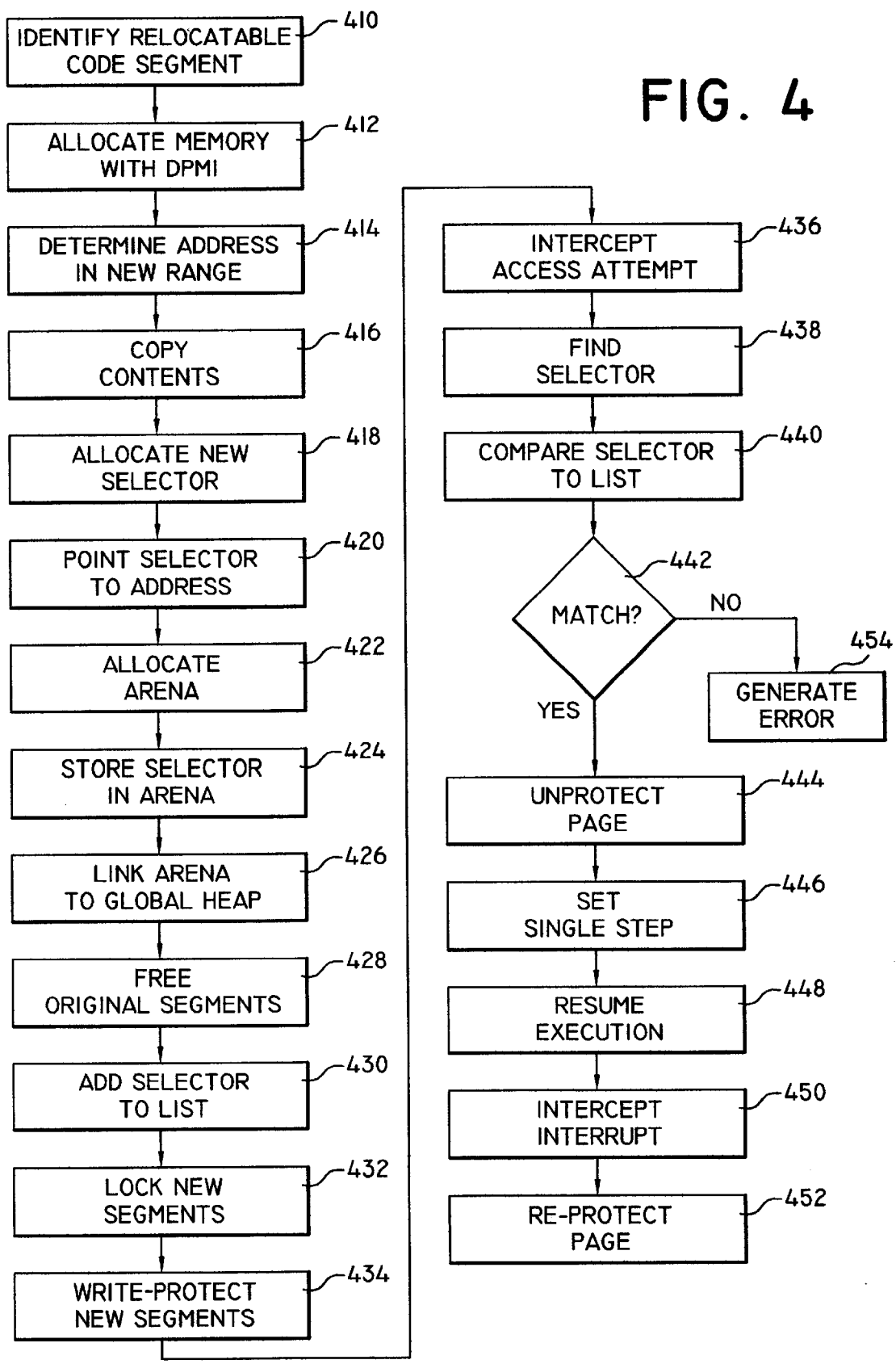
FIG. 4 is a flowchart illustrating the procedure followed in protecting certain WINDOWS Kernel segments by the method of the invention.

The method by which the Kernel code segments are relocated will now be considered in conjunction with the flowchart of FIG. 4. First, the relocatable code segments are identified (step 410). Then, the segments are relocated as described in detail below.

The WINDOWS API does not provide a method for allocating page-aligned memory from the Global Heap. However, this can be accomplished by a function in the DOS Protected Mode Interface ("DPMI") API. Accordingly, the invention uses DPMI to allocate a portion of page-aligned linear memory in a desired size (step 412), relocates the segments into the new memory range, modifies the code selector for each segment accordingly, and links the new memory region into the Global Heap. Specifically, the latter steps are accomplished by determining the address within the new memory range that will contain the segment (step 414), copying the contents of the old segment to this address (step 416), allocating a new code selector using the "Alloc-Selector" service of the WINDOWS API (step 418) and setting the base of the selector to the address within the new range (step 420), allocating a global arena structure to describe the location and extent of the code segment within the new range (step 422), storing the new code selector in the global arena structure (step 424), linking the global arena structure into the Global Heap (step 426), and freeing the original code segments (step 428). All of these steps can be performed using ordinary well-documented functions of the WINDOWS API, which would be known to a person of ordinary skill in the area of WINDOWS system programming. The selector pointing to the relocated code segment is then added to a list of relocated segments (step 430).

The invention repeats this process for each code segment being relocated. It should be noted that once a segment is relocated, it must be locked in place and made nondiscardable (step 432) to prevent the Kernel from attempting to move it out of the write-protected memory region, or to discard it, only to reload it from disk somewhere else. Once all of the segments have been relocated, the invention (by way of its ring 0 virtual device driver component) modifies the CPU page tables for the page-aligned memory range to write-protect each page (step 434).

It is fairly common practice in certain types of software to patch code segments in the Kernel in order to monitor or intercept WINDOWS API function calls. These patches are not usually detrimental to the system. However, when certain pages of Kernel code are write-protected, some of these patches ordinarily might not be able to proceed. Consequently, the Kernel protection aspect of the invention incorporates a method to allow these patching operations to proceed unhindered.

Typically, a software program will perform a Kernel patch by obtaining the code selector associated with the code to be patched, allocating an alias data selector otherwise identical to the code selector, and modifying the code segment by writing to the alias data selector. In order to detect a patch at the time it is made, the invention installs a page fault handler using the "Hook_Invalid_Page_Fault" service of the VMM. The handler then intercepts and monitors page faults to identify write faults, caused by 16-bit applications, occurring on a page that has been write-protected by the invention (step 436). When such a fault occurs, the handler finds the selector through which the access is being made (step 438) and compares the base address of the selector to a list of base addresses for each segment that has been write-protected in the manner described above (step 440). If found (step 442), the invention assumes that the access is being made for the purpose of patching, and allows the access to proceed by temporarily unprotecting the page being accessed (step 444), setting the single-step flag in the CPU context that caused the page fault (step 446), resuming execution and allowing the write access to be completed unhindered (step 448), and intercepting the single-step interrupt occurring immediately following the access (step 450), at which time the page is again write-protected (step 452).

If a match is not found (step 442), then an error is generated (step 454).

WINDOWS 32-Bit System Memory Protection

As discussed above, the invention also provides a method to protect 32-bit, ring 0 system components from corruption by write-protecting the entire memory range, from C0000000 to FFFFFFFF (FIG. 2), in which these components reside. Note that when the Write Protection (WP) bit is clear in the 80386 (or later) processor's CRO flags register, a write attempt made to a write-protected page from a privilege-level-zero program will be allowed to succeed, but a write attempt from a privilege-level-three program will fail, generating a page fault.

Ideally, the ring 0 portion of the operating system, consisting of virtual device drivers and other low-level system components, would function in isolation from the ring 3 portion of the operating system, which consists of the GUI kernel and drivers as well as application software. In practice, however, in the WINDOWS 95 environment, there exist certain channels of communication between these two layers of the system. Typically, a ring 0 virtual device driver may allocate system memory for exclusive or shared use by a ring 3 component, and a ring 3 component may write to locations within a virtual device driver for the purpose of communicating with the virtual device driver.

Therefore, the 32-bit system protection aspect of the invention includes several sub-operations. First, the regions of system memory that are shared with or used by ring 3 components are identified. These locations are few in number and are known; they can be pre-programmed into a utility implementing the system protection function. Second, those regions that are in fixed locations or are seldom accessed from ring 3 are "special-cased" and added to a list of memory regions, as will be discussed in further detail. All other shared regions are then relocated from protected system memory to unprotected shared memory. Subsequent allocations of system memory intended to be shared with ring 3 components are forced to be allocated out of unprotected shared memory. Finally, system memory is then write-protected with respect to ring 3 software by setting the appropriate bits in the page tables. As to the "special-cased" pages, in which only a few locations are occasionally accessed by ring 3 code, page faults are intercepted. Those faults occurring to write-protected pages having an entry in the list of shared memory areas are allowed to proceed.

In the WINDOWS 95 environment, the invention identifies such shared regions as: (a) per-thread data structures allocated by the VWIN32 virtual device and shared with the ring 3 programs KRNL386 and KERNEL32; (b) data structures allocated on behalf of ring 3 software by the VMM through Win32 API services exported by the VMM; (c) APC data structures allocated by VWIN32 and used by KERNEL32 to deliver APC's to ring 3 software; and (d) physical-to-linear memory mappings created by virtual devices in order to allow ring 3 software to access adapter ROM or RAM or to perform direct memory access ("DMA") operations.

Figure 5:
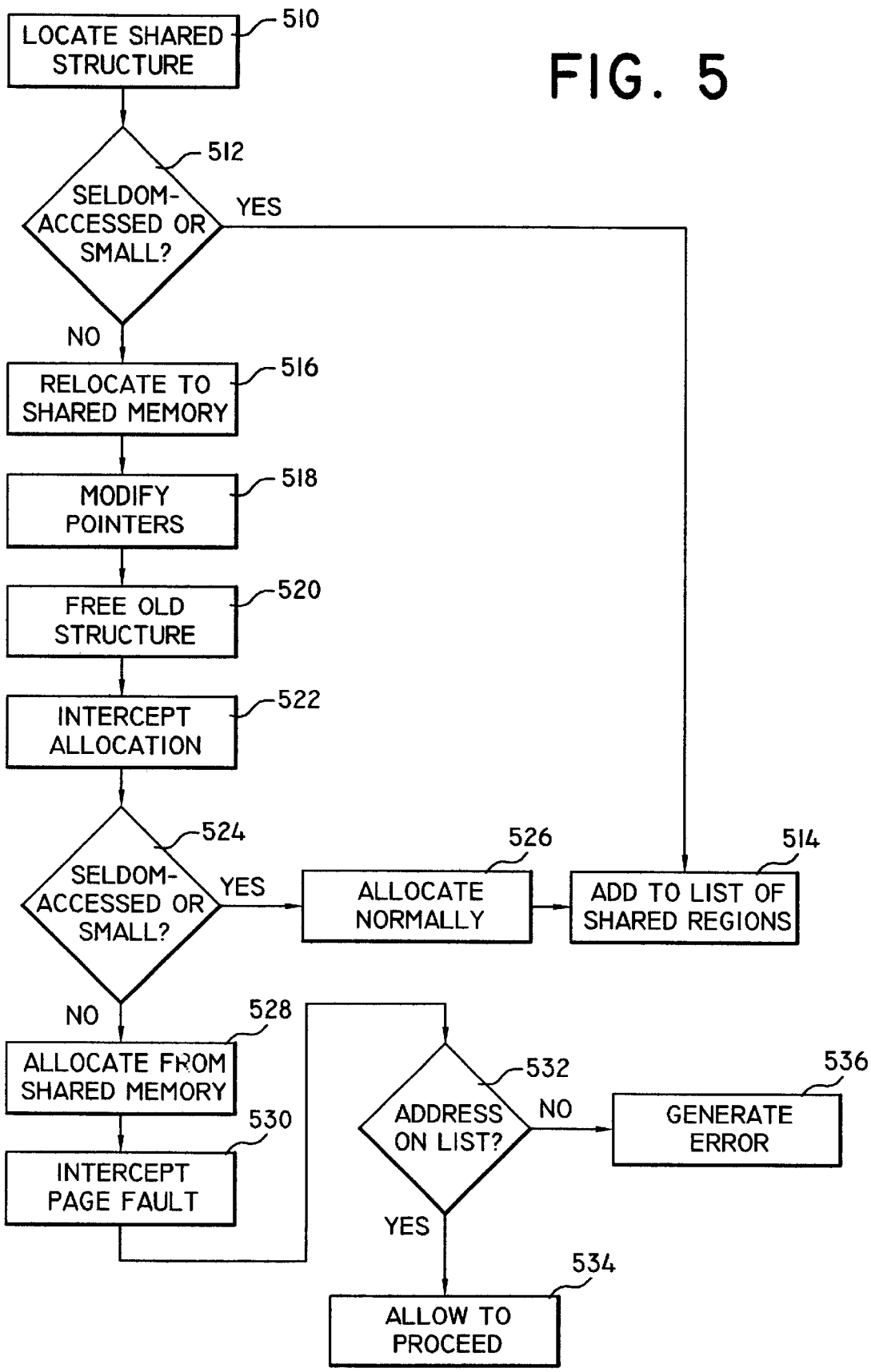
FIG. 5 is a flowchart illustrating the steps performed in protecting certain portions of the WINDOWS operating system from inadvertent alteration.

The operation of this aspect of the invention will now be considered in additional detail in conjunction with the flowchart of FIG. 5. At the time the virtual device driver (ring 0) component of the invention is initialized, some shared data structures may already have been allocated, while other of these structures may be allocated later in the course of the WINDOWS session. For structures that have already been allocated, the invention first determines the current location of each such structure (step 510). If the structure is seldom accessed or includes only a small region of shared memory (step 512), then the region is "special-cased" as discussed above and added to a list of shared regions (step 514). Otherwise the entire region is relocated to unprotected shared memory (step 516), any pointers referencing the original structure are modified (step 518) to reference the new location of the structure, and the old structure is freed (step 520).

For structures that may be allocated at any time after the invention is initialized, the invention intercepts the entry points in the WINDOWS API that cause shared structures to be allocated (step 522). Once again, if only a small region (a few locations) are shared or if the structure is accessed by ring 3 code (step 524), the region is allocated in the normal manner (step 526) and the shared locations are added to the "special-cased" list (step 514). Otherwise, the allocation is redirected to be made from unprotected shared memory instead of protected system memory (step 528).

In order to relocate structures into shared memory, the invention uses the VMM's "_PageAllocate" service to obtain a range of linear memory in the shared memory region from 80000000 to C0000000 (FIG. 2). Sub-allocations are then made from this range as necessary.

For example, ring 3 software can allocate system memory by calling a KERNEL32 function that invokes the "_HeapAllocate" service of the VMM and returns the address of the allocated memory block to the ring 3 software. The invention intercepts this operation to ensure that all heap allocations made by ring 3 software are satisfied from shared memory. In addition or alternatively, the invention patches virtual device driver code that allocates system memory that the invention anticipates will be used for shared purposes, so that control is transferred to the virtual device driver component of the invention that causes the allocation to be satisfied from shared memory instead. For this purpose, several locations in the VWIN32 device are patched, including calls to the "_ListAllocate" and "_HeapAllocate" services of the VMM.

Finally, in order to detect physical-to-linear mappings of adapter ROM or RAM, the invention monitors the "_MapPhysToLinear" service of the VMM to detect RAM address mappings that are outside the range of system RAM, and ensures that the linear range returned by such mappings is unprotected in the page tables and therefore accessible by ring 3 software. In order to detect at load time of the invention what regions of physical memory if any have already been mapped in this way, the invention analyzes the list of memory "arenas," which are maintained by the VMM to contain information on memory allocations. Each arena represents one allocation, and contains information on the allocation's starting page address and its length in sequential pages. The invention analyzes the page tables for each page in each allocation to determine whether the assigned physical memory represents contiguous physical memory likely to have been assigned through special use of the "_PageAllocate" service in combination with the "PageUseAlign" option. An allocation which is backed by contiguous physical memory that meets a threshold size requirement (e.g., four contiguous pages, or 16K) is then excluded from write-protection across the range of the allocation, as it is probably a DMA buffer.

As noted above, in isolated cases a virtual device driver may provide to ring 3 software an internal location for the ring 3 software to access or modify. For example, the VWIN32 device provides several such locations for use by KERNEL32. In order to allow this kind of operation to succeed, the invention maintains a list of locations within virtual device drivers that are allowed to be modified. As discussed above, these locations are typically known in advance. When the virtual device driver pages are write-protected, any attempt by ring 3 software to modify data at one of these locations will result in a page fault which is then intercepted by the invention (step 530). Upon determining that the page fault occurred at an allowed address (step 532) (i.e., the address is on the list of allowed locations), the ring 0 component of the invention permits the operation to succeed (step 534) by single-stepping the access, as described above (see FIG. 4, steps 444–452). Otherwise, an error is generated (step 536).

In addition or alternatively, the invention maintains a list of locations in ring 3 code which cause write accesses to write-protected pages to occur. The page fault handler then determines from the instruction pointer of the program whether the access should be allowed by single-stepping the access.

After causing all necessary structures to be relocated and constructing lists of permissible addresses as described above, the utility performs the actual step of write-protecting system memory by modifying the appropriate entries in the page tables and page directories accordingly. However, to ensure that memory that is subsequently allocated and mapped in the page tables by the VMM also becomes write-protected, the invention intercepts several of the VMM services that perform such page mapping and allocation, including the "_PageAllocate," "_PageCommit," "_PageCommitPhys," and "_PageAttach" services. After analyzing the parameters and results of these services, the invention modifies page tables and directories to ensure that any newly-committed memory becomes write-protected, write-protected memory located at an address within the system region that is mapped to an address within the private or shared region is not write-protected at the address to which it is mapped, and adapter ROM or RAM memory, or memory that will be used for DMA that is mapped by "_PageCommitPhys," is not write protected.

DOS Memory Protection

The invention also sets forth a method by which certain DOS memory is protected from corruption by WINDOWS programs. This memory contains the real-mode IVT, DOS itself, the HMA, and any real-mode device drivers loaded prior to WINDOWS. As shown in FIG. 2, WINDOWS allocates all remaining DOS memory for its own use at initialization. This memory is available for use by virtual device drivers and usually contains a portion of the 16-bit Global Heap. DOS only, or pre-WINDOWS, memory is identified as starting from the bottom of memory (0:0), up to the First V86 Page, which is the starting address used by Win386, and also including the HMA from FFFF:10 through FFFF:FFFF. Typically, there is no reason for a 16- or 32-bit WINDOWS program to modify this DOS memory, the corruption of which however is likely to cause a system crash. However DOS memory cannot be simply write-protected for the reason that it is in use by DOS. Therefore, as shown in the flowchart of FIG. 6, the invention causes this memory to be write-protected whenever WINDOWS programs are executing, and unprotected when DOS is executing.

This is accomplished by monitoring the system (step 610), including intercepting the VMM services "_SetV86ExecMode" and "_SetPMExecMode," which cause the CPU context to switch between real (V86) and protected (WINDOWS) mode. When the CPU context is set to protected mode (step 612), the invention modifies the page tables so that DOS memory is write-protected (step 614) from access within a WINDOWS program. When the CPU context is set to V86 mode (step 616), the page tables are restored (step 618) so that DOS and other real mode software can execute.

In practice, however, some WINDOWS programs are required to modify certain locations within DOS memory, including locations within the IVT or within DOS itself. Therefore, the invention constructs a list of those locations (typically known in advance) which are allowed to be accessed, and governs access to the allowed locations within the page fault handler, as described above, by single-stepping the access. Specifically, when a page fault occurs (step 620), the address of the access is checked against a list of allowed locations (step 622). If the access is authorized (step 624), it is allowed to proceed (step 626). Otherwise, an error condition is returned to the operating system (step 628).

Cache Memory Protection

Finally, the invention prescribes a method for further protecting cache memory from corruption. As noted, cache memory managed by the VCACHE virtual device is, by default, protected from ring 3 read or write access by setting the page tables associated with cache memory to allow only supervisor mode access, i.e. access by virtual device drivers. However, cache memory typically comprises a substantial portion of mapped memory in the system, and therefore offers a relatively broad target.

Of the entire mapped cache, only a few pages are likely to be in use at a given time. Therefore, the invention provides a method to protect the remainder of the cache pages from inadvertent access, even from a virtual device driver, while they are not being used. To accomplish this, the majority of cache blocks, specifically the ones not presently being used, can be marked as "not present," thereby preventing inadvertent access (step 710).

The VCACHE API specifies that while a cache block is being accessed, it must be "held" by incrementing a hold count associated with each block. However, VCACHE services are not asynchronous, so cache blocks are never recycled at interrupt time. Some VCACHE clients, such as the VFAT disk file system virtual device driver, rely on this behavior and do not always hold cache blocks while they are being accessed. Therefore it is insufficient to examine the hold count to determine whether a cache block is being used. Instead, the invention monitors the use of cache blocks so that as soon as a block is accessed, the cache page is marked "present" in the page tables. The invention tracks which blocks are being used so that they can be re-protected by marking them "not present" in the page tables at the earliest opportunity.

Several of the VCACHE services are monitored for these purposes (step 712). The invention intercepts the "VCACHE_FindBlock" service (step 714) that performs a cache lookup and optionally holds the cache block prior to returning. The interceptor passes the request to VCACHE and checks the result to determine whether a cache block was returned. If so, the invention causes the page to be marked "present" in the page tables (step 716) and also adds the page to a list of pages that have been temporarily unprotected in this way (step 718). The invention then schedules an event (step 720) to be executed at the time the virtual machine resumes execution. At the time the event is executed, all cache blocks currently being used must be held to prevent them from being recycled. Therefore, the invention iterates the list of temporarily unprotected cache pages, and for each page that is not held (step 722), re-protects the page by marking the associated page table entry "not present" (step 724).

In addition, the invention monitors the "VCACHE_Hold" and "VCACHE_Unhold" services (step 726) to provide that when a cache block is held or unheld, it is also temporarily unprotected (step 728), added to the list (step 718), and scheduled to be re-protected (step 720) as described above. The "VCACHE_FreeBlock" service is monitored (step 730) so that when a cache block is freed, the page is marked "present" (step 732) and it is removed from the list (step 734). In the WINDOWS 95 environment, the invention monitors the "VCACHE_RelinquishPage" service (step 730) so that when a cache page is returned to the memory manager, it is first marked as "present" (step 732) and removed from the list of unprotected pages (step 734).

A specific embodiment of the invention has been described as operated primarily under the Microsoft WINDOWS operating system, particularly WINDOWS 95, and on Intel and compatible microprocessors. However, it should be recognized that the invention as claimed would be operative in other fault-driven operating environments, as well, including but not limited to other versions of Microsoft WINDOWS, and is not limited to the specific embodiments described above.

What is claimed is:

1. A method for handling an unexpected CPU exception arising in connection with an application having a CPU context and running under a multitasking operating system environment, comprising the steps of:

intercepting a fault including monitoring an operating system function used to pass a message to a user; and examining parameters passed to the function to determine that the message is a fault notification message;

establishing a message loop in a context that is independent of the CPU context of the application; and reactivating the application by resuming execution at the message loop, wherein the determining step comprises the steps of:
  modifying the parameters passed to the function to give the user an option to reactivate the application;
  receiving an input from the user; and
  analyzing the input to determine whether the user desires to reactivate the application.

2. The method of claim 1, wherein the analyzing step is performed in a high-privilege-level CPU state.

3. The method of claim 1, wherein the analyzing step is performed in a low-privilege-level CPU state.

4. The method of claim 1, wherein the establishing step comprises the steps of:
  identifying a corrected value for at least one CPU register;
  restoring the corrected value to the CPU register;
  initializing a substitute message loop; and
  setting an instruction pointer to correspond to the substitute message loop.

5. A method for reactivating an application that is in an infinite loop, wherein the application has a CPU context and runs under a multitasking operating system environment, comprising the steps of:
  intercepting an attempt to close the application including monitoring an operating system function used to pass a message to a user; and examining parameters passed to the function to determine that the message is an application closing message;
  establishing a message loop in a context that is independent of the CPU context of the application; and
  reactivating the application by resuming execution at the message loop, wherein the determining step comprises the steps of:
    modifying the parameters passed to the function to give the user an option to reactivate the application;
    receiving an input from the user; and
    analyzing the input to determine whether the user desires to reactivate the application.

6. The method of claim 5, wherein the analyzing step is performed in a high-privilege-level CPU state.

7. The method of claim 5, wherein the analyzing step is performed in a low-privilege-level CPU state.

8. The method of claim 5, wherein the establishing step comprises the steps of:
  identifying a corrected value for at least one CPU register;
  restoring the corrected value to the CPU register;
  initializing a substitute message loop; and
  setting an instruction pointer to correspond to the substitute message loop.

9. A method for preventing unauthorized access by a CPU to an area of an operating system, comprising the steps of:
  selectively write-protecting the area by identifying a protectable region, relocating contents of the region to another area of memory, and protecting the relocated region;
  intercepting an attempt to access the area;
  determining whether the attempt should be permitted; and
  if the attempt should be permitted, allowing the access to proceed, wherein the relocating step comprises the steps of:
    identifying a new location;
    copying the contents from the region to the new location; and
    modifying any pointers to the region to reflect the new location.

10. The method of claim 9, wherein the relocating step further comprises the step of locking the relocated region to prevent the contents from being moved or discarded.

11. The method of claim 9, wherein the protecting step comprises the steps of: setting a write protection flag corresponding to the relocated region; and adding the relocated region to a list of protected regions.

12. The method of claim 9, wherein the intercepting step comprises trapping a write protection fault CPU exception.

13. The method of claim 11, wherein the determining step comprises the steps of: finding a selector corresponding to the area; identifying the relocated region pointed to by the selector; and locating the relocated region in the list of protected regions.

14. The method of claim 9, wherein the allowing step comprises the steps of:
  unprotecting the area;
  setting a single-step flag;
  resuming execution;
  intercepting a single-step interrupt; and
  reprotecting the area.

15. The method of claim 9, wherein the write-protecting step comprises the steps of:
  identifying a shared data area;
  relocating the shared data area;
  ensuring that the shard data area remains unprotected; and
  protecting a remaining portion of the operating system.

16. The method of claim 15, wherein the identifying step comprises finding a pre-allocated region that is used by high-privilege-level programs and low-privilege-level programs.

17. The method of claim 15, wherein the identifying step comprises intercepting an attempt to allocate a region for use by high-privilege-level programs and low-privilege-level programs.

18. The method of claim 15, wherein the protecting step comprises setting a write protection flag corresponding to the remaining portion.

19. The method of claim 15, wherein the relocating step comprises the steps of:
  determining a frequency of access for the shared data area;
  comparing the frequency of access to a threshold;
  if the frequency of access is greater than the threshold, moving the shared data area to an unprotected region; and
  if the frequency of access is less than the threshold, adding the shared data area to a list of shared regions.

20. The method of claim 19, wherein the relocating step comprises the steps of:
  identifying a new location;
  copying contents from the shared data area to the new location; and
  modifying any pointers to the shared data area to reflect the new location.

21. The method of claim 19, wherein the relocating step comprises the steps of:
  identifying an unprotected region; and
  allocating the shared data area from the unprotected region.

22. The method of claim 9, wherein:
the CPU has access to a real-mode memory area;
the CPU has a protected addressing mode; and
the CPU has a V86 addressing mode;
wherein the write-protecting step comprises the steps of:
  determining a CPU addressing mode;
  identifying the real-mode memory area;
  when the addressing mode is protected mode, protecting the real-mode memory area; and
  when the addressing mode is V86 mode, unprotecting the real-mode memory area.

23. The method of claim 9, wherein the write-protecting step comprises the steps of:
  identifying an active cache region;
  identifying an inactive cache region;
  protecting the inactive cache region; and
  scheduling an event to protect the active region.

24. The method of claim 23, wherein the protecting step comprises marking the inactive cache region as not present.

25. The method of claim 23, wherein the intercepting step comprises trapping at least one cache function.

26. The method of claim 25, wherein the cache function is provided by a VCACHE service of the operating system.

27. The method of claim 23, wherein the scheduling step comprises the steps of:
  adding the event to a list of events to be processed; and
  processing the event.

28. The method of claim 27, wherein the processing step comprises the steps of:
  adding the active cache region to a list;
  identifying regions on the list that are not being held; and
  protecting the regions on the list that are not being held.

29. A method for preventing unauthorized access by a CPU to an area of an operating system, comprising the steps of:
  selectively write-protecting the area by identifying a protectable region, relocating contents of the region to another area of memory, and protecting the relocated region;
  intercepting an attempt to access the area;
  determining whether the attempt should be permitted; and
  if the attempt should be permitted, allowing the access to proceed, wherein the protecting step comprises the steps of:
    setting a write protection flag corresponding to the relocated region; and
    adding the relocated region to a list of protected regions.

30. The method of claim 29, wherein the determining step comprises the steps of:
  finding a selector corresponding to the area;
  identifying the relocated region pointed to by the selector; and
  locating the relocated region in the list of protected regions.

31. A method for preventing unauthorized access by a CPU to an area of an operating system, comprising the steps of:
  selectively write-protecting the area by identifying a protectable region, relocating contents of the region to another area of memory, and protecting the relocated region;
  intercepting an attempt to access the area;
  determining whether the attempt should be permitted; and
  if the attempt should be permitted, allowing the access to proceed, wherein the allowing step comprises the steps of:
    unprotecting the area;
    setting a single-step flag;
    resuming execution;
    intercepting a single-step interrupt; and
    reprotecting the area.

32. A method for preventing unauthorized access by a CPU to an area of an operating system, comprising the steps of:
  selectively write-protecting the area by identifying a protectable region, relocating contents of the region to another area of memory, and protecting the relocated region;
  intercepting an attempt to access the area;
  determining whether the attempt should be permitted; and
  if the attempt should be permitted, allowing the access to proceed, wherein the write-protecting step comprises the steps of:
    identifying a shared data area including intercepting an attempt to allocate a region for use by high-privilege-level programs and low-privilege-level programs;
    relocating the shared data area;
    ensuring that the shared data area remains unprotected; and
    protecting a remaining portion of the operating system.

33. A method for preventing unauthorized access by a CPU to an area of an operating system, comprising the steps of:
  selectively write-protecting the area by identifying a protectable region, relocating contents of the region to another area of memory, and protecting the relocated region;
  intercepting an attempt to access the area;
  determining whether the attempt should be permitted; and
  if the attempt should be permitted, allowing the access to proceed, wherein the write-protecting step comprises the steps of:
    identifying a shared data area;
    relocating the shared data area;
    ensuring that the shared data area remains unprotected; and
    protecting a remaining portion of the operating system including setting a write protection flag corresponding to the remaining portion.

34. A method for preventing unauthorized access by a CPU to an area of an operating system, comprising the steps of:
  selectively write-protecting the area by identifying a protectable region, relocating contents of the region to another area of memory, and protecting the relocated region;
  intercepting an attempt to access the area;
  determining whether the attempt should be permitted; and
  if the attempt should be permitted, allowing the access to proceed, wherein the write-protecting step comprises the steps of:
    identifying a shared data area;
    relocating the shared data area including
      determining a frequency of access for the shared data area;
      comparing the frequency of access to a threshold;
      if the frequency of access is greater than the threshold, moving the shared data area to an unprotected region; and if the frequency of access is less than the threshold, adding the shared data area to a list of shared regions;

ensuring that the shared data area remains unprotected; and protecting a remaining portion of the operating system.

35. The method of claim 34, wherein the relocating step comprises the steps of:

identifying a new location;

copying contents from the shared data area to the new location; and modifying any pointers to the shared data area to reflect the new location.

36. The method of claim 34, wherein the relocating step comprises the steps of:

identifying an unprotected region; and allocating the shared data area from the unprotected region.

37. A method for preventing unauthorized access by a CPU to an area of an operating system, comprising the steps of:

selectively write-protecting the area by identifying a protectable region, relocating contents of the region to another area of memory, and protecting the relocated region;

intercepting an attempt to access the area;

determining whether the attempt should be permitted; and if the attempt should be permitted, allowing the access to proceed, wherein the CPU has access to a real-mode memory area; the CPU has a protected addressing mode; and the CPU has a V86 addressing mode; and wherein the write-protecting step comprises the steps of:

determining a CPU addressing mode; identifying the real-mode memory area;

when the addressing mode is protected mode, protecting the real-mode memory area; and when the addressing mode is V86 mode, unprotecting the real-mode memory area.

38. A method for preventing unauthorized access by a CPU to an area of an operating system, comprising the steps of:

selectively write-protecting the area by identifying a protectable region, relocating contents of the region to another area of memory, and protecting the relocated region;

intercepting an attempt to access the area;

determining whether the attempt should be permitted; and if the attempt should be permitted, allowing the access to proceed, wherein the write-protecting step comprises the steps of:

identifying an active cache region;

identifying an inactive cache region;

protecting the inactive cache region including marking the inactive cache region as not present; and scheduling an event to protect the active region.

39. A method for preventing unauthorized access by a CPU to an area of an operating system, comprising the steps of:

selectively write-protecting the area by identifying a protectable region, relocating contents of the region to another area of memory, and protecting the relocated region;

intercepting an attempt to access the area including trapping at least one cache function;

determining whether the attempt should be permitted; and if the attempt should be permitted, allowing the access to proceed, wherein the write-protecting step comprises the steps of:

identifying an active cache region;

identifying an inactive cache region;

protecting the inactive cache region; and scheduling an event to protect the active region.

40. The method of claim 39, wherein the cache function is provided by a VCACHE service of the operating system.

41. A method for preventing unauthorized access by a CPU to an area of an operating system, comprising the steps of:

selectively write-protecting the area by identifying a protectable region, relocating contents of the region to another area of memory, and protecting the relocated region;

intercepting an attempt to access the area;

determining whether the attempt should be permitted; and if the attempt should be permitted, allowing the access to proceed, wherein the write-protecting step comprises the steps of:

identifying an active cache region;

identifying an inactive cache region;

protecting the inactive cache region; and scheduling an event to protect the active region including adding the event to a list of events to be processed and processing the event.

42. The method of claim 41, wherein the processing step comprises the steps of:

adding the active cache region to a list;

identifying regions on the list that are not being held; and protecting the regions on the list that are not being held.

* * * * *